July 1, 1930. K. KUROKAWA 1,769,741

MACHINE FOR MANUFACTURING HOLLOW RUBBER BALLS

Filed Dec. 21, 1927

Inventor
Kensuke Kurokawa,
by Chas. J. Williamson
Atty.

Patented July 1, 1930

1,769,741

UNITED STATES PATENT OFFICE

KENSUKE KUROKAWA, OF SHIMONOSEKI, JAPAN

MACHINE FOR MANUFACTURING HOLLOW RUBBER BALLS

Application filed December 21, 1927. Serial No. 241,614.

This invention relates to apparatus for making hollow rubber balls and has for its object the provision of a machine comprising means and elements adapted to take in a length of unvulcanized sheet rubber and cut it into pieces of proper size and to transform them into hemispherical segments ready for the formation of hollow balls. The operation of manufacture is such that the foremost portion of a strip of sheet rubber is cut round, while being cut straight across the length of the strip at the rearmost point of the portion, and the round piece of rubber so cut off is thereafter transformed into a hemispherical segment by means of a presser and mould heated by steam. It is obvious that such segment may be readily used for the manufacture of a hollow ball. To remove the segment out from the mould, means is provided for slanting the mould to a sufficient degree so that the segment may be easily detached from it.

According to the invention, segments of rubber as referred to may be produced in a continuous flow and consequently in a large number: and in order to manufacture hollow balls from them, it is simply necessary to join together every two of them at a single circumferential line encircling the border of their hemispherical body. Such characteristics make the invention considerably advantageous over the known machines and apparatus for manufacturing hollow rubber balls.

The known method of making a hollow ball from two segments embodies a stage of operation in which a round piece of sheet rubber is folded up into a semicircular segment and then pressed in the mould to be transformed into a hemispherical half of a hollow ball. The draw-back in this method is the fact that it is impossible to obtain a segment of even thickness, and moreover that the segment is likely to become wrinkled at the portion where it is folded up. It must also be pointed out that in the process the portion of the sheet rubber cut wasted as scrap is in no small amount. Hence economy in the raw material cannot be expected.

Hollow balls made from four segments have generally been disliked for the reason that they have many joint places and that, due to the unequalness in the expanding powers, while being inflated, of such joints and of plain parts, they are finished in bad state and often impregnated with the causes for leakage. According to the invention these defects are entirely obviated.

Figure 1:
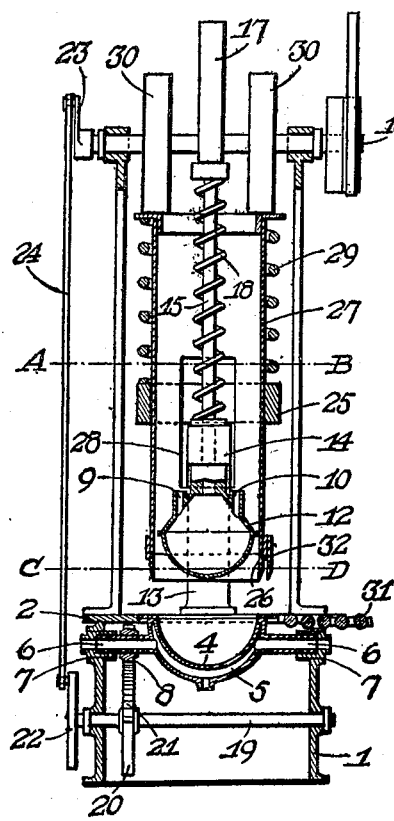
Figure 2:
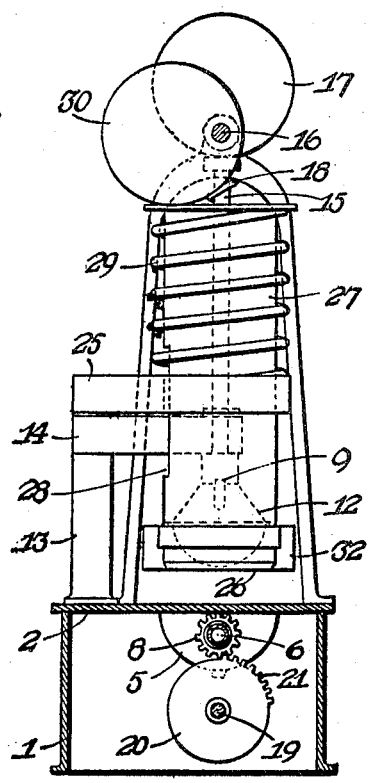
Figure 3:
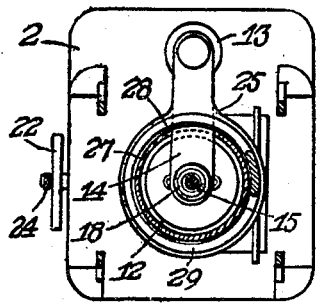
Figure 4:
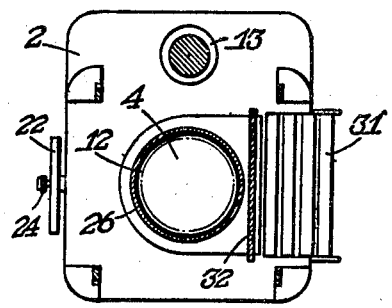

The accompanying drawings illustrate by way of example a hollow rubber ball manufacturing machine embodying most appropriately the features of the invention: in which Fig. 1 is a vertical sectional elevational view of the machine, Fig. 2 is a side elevational view of the same, and Figs. 3 and 4 are sectional plan views as seen on the lines A—B and C—D of Fig. 1 respectively.

In the drawings same reference numerals denote identical parts.

Referring to the drawings, the supporting frame 1 supports a table or bed 2 beneath which is provided a hemispherical mould 4 mounted on a hollow shaft 6. The hollow shaft is journalled in bearings 7, 7 and carries a pinion 8 that may mesh with the toothed part 21 of a segment wheel 20 mounted on a spindle 19 located below the hollow shaft. The hollow shaft 6 is connected at one end with an outer tubing in order to take in steam and admit it into the steam-jacket 5. In actual use, a number of such elements are provided in series and arranged in such a manner that the outlet of the hollow shaft in the first unit may be connected to the inlet of the hollow shaft in the second and so on, until the final hollow shaft opens to the air.

Right above the mould 4 is supported a presser 12 having a hollow presser-head provided on one side with a steam-inlet 9 and on the other a steam outlet 10. The presser 12 is attached to the lower end of a reciprocating stem 15 which is vertically slidably held in position by an arm 14 upheld by a support 13 fixed on the bed 2. The upper end of the stem 15 is engaged with the periphery of a disc 17 mounted eccentrically on a shaft 16 provided at the uppermost portion of the machine. The stem 15 itself is at all times forced upwards by means of a spring 18.

On the support 13 and above the arm 14 is mounted a forked arm 25 which further holds up a tubular cutter-casing 27 provided at the lower end with a cutting element. As shown in the drawing, the presser, reciprocating stem, and spring, referred to, are all housed in the cutter-casing 27, whilst the arm 14 projects through an opening 28 into the interior of the cutter-casing. The cutter-casing is also encircled by a spring 29 and therefore the former always tends to move upwards. As a result, the upper flange of the casing is kept in engagement with the peripheries of discs 30, 30, the said discs being eccentrically mounted on the shaft 16 in a certain angular relation with the disc 16. The cutting element of the cutting-casing consists of an annular edge 26 and a linear or straight edge 32, the diameter of the annular edge being a little greater than the width of the inside hemisphere of the mould and the straight edge extending slightly longer than the said diameter of the annular edge. The straight edge is located at the right hand side of the annular edge, reference being had to Fig. 1 of the drawings, where the sheet rubber is introduced.

The upper shaft 16 is provided with a crank 23 and the lower spindle 19 with a crank disc 22, whilst a lengthy rod 24 connects these crank members. The arrangement of the elements is such that when the reciprocating stem 15 is lowered with its presser-head 12 forced down to the mould, the latter is maintained upright, but that during the upward travel of the stem and as soon as the presser-head is lifted quite clear of the mould, the last mentioned element is tilted to an angle ranging from 90° to 180° and recovers its upright position before the reciprocating stem resumes its downward stroke. In the case where a series of the elements of the described construction are provided as co-operating, it is preferable to have those moulds slanted one after another in serial succession than have them tilted all at once and in the same manner. This serial tilting may be effected by suitably adjusting the relative angles between the toothed parts of the segment wheels and in doing so it is necessary to adequately fix the segment wheels to the relative spindles. The corresponding strokes of the presser heads may be accomplished by mounting the discs 17 on the upper shaft at suitable eccentricities. Such an arrangement enables one operator to control at a time a number of moulds by himself.

No sooner has the mould returned to the upright position, than the cutter-casing commences to slide down while a strip of sheet rubber is conveyed on to the mould being actuated by a series of rollers 31. The cutting element of the cutter-casing now acts, co-operating with the flange of the mould, upon the strip, and cuts it out round at the inner portion whilst a straight cut is being made across the length of the strip at the rear. Then the motion of the cutter-casing is reciprocated and goes upwards being accompanied by the simultaneous downward stroke of the presser. In the meantime it is required to remove the scraps of rubber that have been cut off the work.

In actual operation, the first stage consists of heating the mould and presser-head to a suitable degree by steam admitted through the hollow shaft and through the inlet opening on the presser-head. The next is to place a strip of sheet rubber on the rollers provided on the machine bed and have it conveyed on to the mould just at the instant in which the presser-head has been lifted clear enough of the latter. Hereupon the cutter-casing will come down and cut the strip of rubber round at the inner portion and straight at the rear as has been described. In no time the presser will be lowered and force the round piece of rubber so cut off down into the mould and therein press and extend it into a perfectly hemispherical segment of even thickness. Finally the presser will be lifted again and meanwhile the mould will be slanted to an angle as from 90° and 180° thereby allowing the segment to depart from the mould.

According to the invention the operation can be carried out with considerable quickness. Moreover, the fact that the segments can be joined together at one place alone, enhances the quality of the manufacture to a great extent.

Having now particularly described the nature of this said invention and ascertained the manner in which it is to be performed, I declare that what I claim is:

1. A machine for making rubber articles having a mould surrounded by a jacket to provide a space for a heating medium, a hollow shaft carrying said mould, a hollow presser movable into and out of the mould, and a reciprocating cutter having both annular and straight cutting edges.

2. A hollow rubber article manufacturing machine having a mould surrounded by a jacket for a heating medium, a hollow shaft carrying said mould, a hollow presser above said mould a vertically reciprocating stem connected with said presser, and a cutter around the said presser and provided with both annular and straight edges, and means to reciprocate said cutter.

3. A machine for making hollow rubber articles comprising two cooperating male and female members mounted for relative to and fro motion, and an annular cutter surrounding the male member for cutting a blank preliminary to the action of said members.

4. A machine for making hollow rubber articles comprising two cooperating male and female members mounted for relative to and fro motion, and an annular cutter surrounding the male member for cutting a blank preliminary to the action of said members, both said members being hollow to provide spaces for a heating medium.

In testimony whereof I hereunto affix my signature.

KENSUKE KUROKAWA.